Feb. 22, 1955  H. N. SUDDUTH  2,702,612
SLACK ADJUSTER ARRANGEMENT FOR EMPTY AND LOAD BRAKES
Filed May 29, 1952
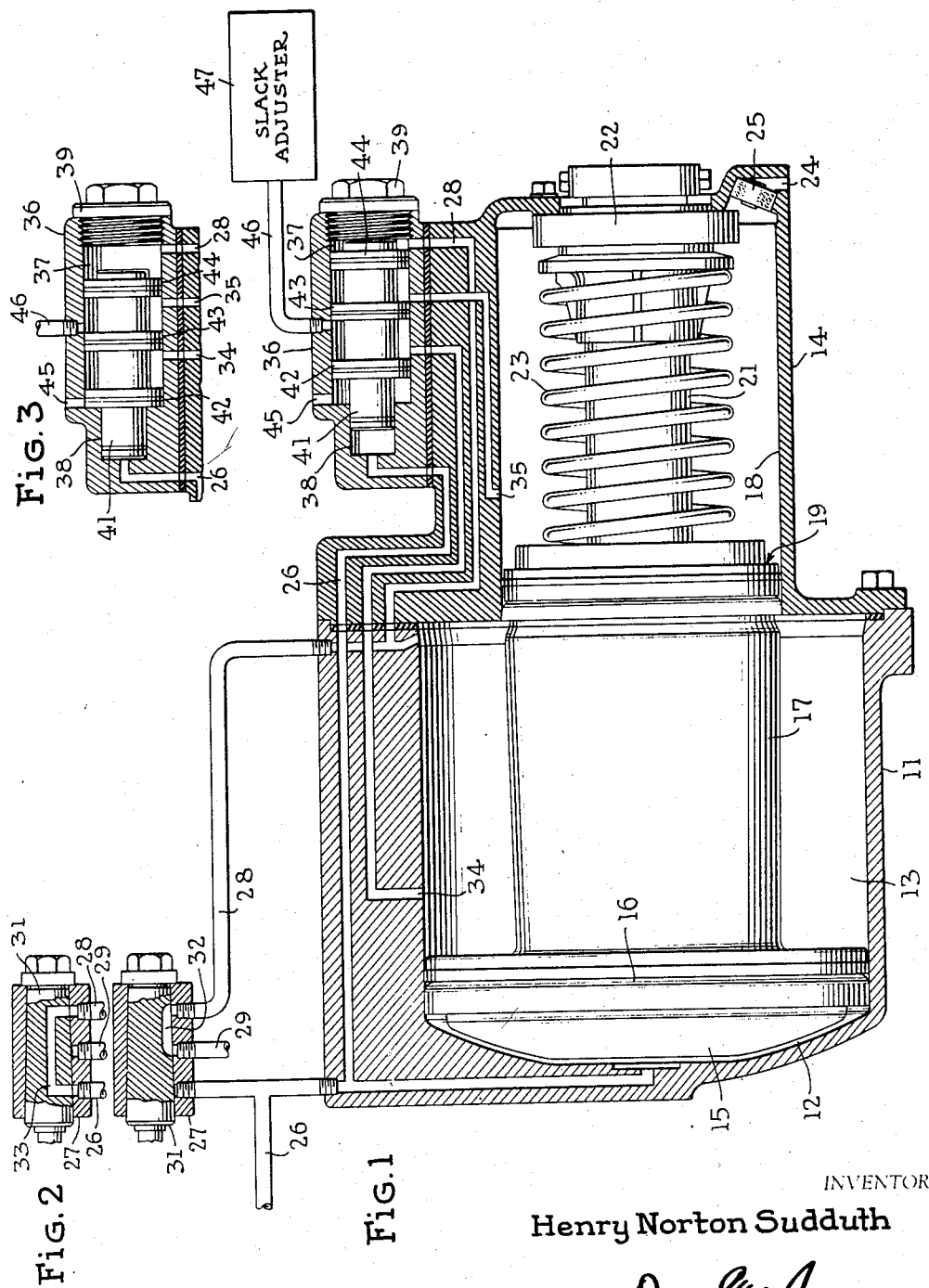
INVENTOR
Henry Norton Sudduth
BY
ATTORNEYS

United States Patent Office 2,702,612
Patented Feb. 22, 1955

2,702,612

SLACK ADJUSTER ARRANGEMENT FOR EMPTY AND LOAD BRAKES

Henry Norton Sudduth, Watertown, N. Y., assignor to The New York Air Brake Company, a corporation of New Jersey Application May 29, 1952, Serial No. 290,631

3 Claims. (Cl. 188—196)

This invention relates to empty-and-load brakes and particularly to means for actuating a slack adjuster of the pneumatic type from an empty-and-load brake cylinder or the differential piston type.

The slack adjuster in most common use comprises a slack-adjusting ratchet nut and a coacting pressure-motor-actuated ratchet pawl which makes its idle stroke under pneumatic pressure derived from a side port in the brake cylinder (if the piston over-travels), and its nut-turning stroke under the urge of a return spring when brake cylinder pressure is released.

The advent of the differential piston type of empty-and-load brake posed a problem, because a side port that would correctly pilot a slack-adjuster in load setting, would cause it to malfunction in empty setting.

The present invention solves the problem by providing two side ports in the differential cylinder and valve means which select the proper side port automatically in response to setting the brake for empty or for load conditions. A changeover valve of either the automatic or manual type is provided to control charging of the brake cylinder working space so that it may operate as a single piston motor or as a differential piston motor.

In the preferred arrangement the port selection is made by a two-position piston valve which is shifted full stroke by a motor which moves reversely in initial applications following a change between empty-and-load settings. Thus it is possible to adhere to the side port whose serviceability is proved, avoid lost-motion valve devices which are apt to deteriorate when subject to continued vibration and avoid any change in the slack adjuster itself.

A satisfactory embodiment of the invention will now be described by reference to the accompanying drawing in which:

Fig. 1 is an axial section through a differential piston brake cylinder and through its side-port selecting-valve. In this view the empty-and-load setting cock is shown in axial section, in "load" position. The port selecting valve is shown in "load" position. The brake piston is shown in release position. The ports are shown as if all lay in the plane of section, a convention common in this art.

Fig. 2 is an axial section of the empty-and-load setting cock in "empty" position.

Fig. 3 is an axial section of the port selecting valve in "empty" position.

In the description, statements of direction refer to Fig. 1. Ports, passages and pipes in continuous free communication are identified by the same reference numeral.

The drawing is diagrammatic to the extent that the ports are drawn as if all lay in the plane of section.

The brake cylinder comprises a main casting 11 and a front head casting 14. Casting 11 has a cylindrical bore in which the larger piston head 15 is reciprocable. The piston head 15 carries a packing ring 16 and has a trunk-like extension or rod 17 which does not closely fit the bore 18 of casting 14 but carries at its outer end the smaller piston which takes the form of a packing ring 19, larger in diameter than the trunk 17. The piston 15 separates two working spaces, the head end space 12 in which the whole area of the piston is exposed to pressure, and the annular rod end space 13 in which the effective area of the piston is diminished by an area equal to the cross section of the bore 18.

The piston 15 and rod 17 are coaxial and the latter carries at its end a coaxial tubular push-rod extension 21 which slides through a combined guide and dust seal 22. A coil compression spring 23 returns the piston to its release position shown in Fig. 1. A breather port 24 with filter 25 maintains the space to the right of packing 19 and within housing 14 at atmospheric pressure or substantially so at all times.

The brake controlling valve device, which commonly would be an AB valve is not shown, but its brake cylinder connecting pipe appears at 26 and is constantly in communication with head-end working space 12.

When pipe 26 supplies air under pressure only to space 12 and space 13 is vented to atmosphere, the cylinder is set to afford load braking. When pipe 26 supplies air under pressure to both spaces 12 and 13, the parts 15, 19 function as a differential piston affording lighter brake applications, suited for empty cars.

The connections just mentioned can be afforded in various ways but Figs. 1 and 2 show probably the simplest possible arrangement. A cock body 27 is connected to pipe 26 and consequently to the control valve and space 12. There is also a pipe connection 28 to space 13 and a vent connection 29 to atmosphere. The cock plug 31 has two functional positions, namely "load" position, Fig. 1, in which connection 26 is blanked and a port 32 connects 28 (and hence space 13) to vent 29, and an "empty" position in which a port 33 connects lines 26 and 28, and vent 29 is blanked.

The structure so far described in detail is known.

In "load" position of cock 31 only space 12 is charged during an application and hence the side port 34 can be used to energize the slack adjuster when and if the piston 15 overtravels the port. Port 34 ceases to be usable in "empty" position of cock 31 because both spaces 12 and 13 are charged in every application.

The invention provides means to close port 34 and open a second port 35 to the slack adjuster. Port 35 is so located that it will be overtraveled by piston head 19 at substantially the same time that port 34 is overtraveled by piston head 15. A pressure-actuated piston valve located in housing 36 and hereinafter called the selector valve, moves full-stroke between two positions in which respectively it closes a different one of ports 34 and 35 and opens the other of said two ports to the slack adjuster.

Selector valve housing 36 has a large bore 37 at its right hand end and a smaller bore 38 at its left hand end, the right hand end of bore 37 being closed by a screw plug 39 and the left end of the smaller bore being blind. The combined motor and valve element of the selector valve comprises a small plunger 41 and a hub which carries three spaced annular valve pistons or lands 42, 43, and 44, which seal in bore 37 and are slidable therein.

Connection 26 leads to bore 38 at the left of plunger 41. Connection 28 leads to bore 37 at the right of land 44. Port 34 always communicates with bore 37 between lands 42 and 43. Port 35 always communicates with bore 37 between lands 43 and 44. The space in bore 37 to the left of land 42 is vented to atmosphere at 45.

The pipe and port 46 connect the slack adjuster 47 with the space to one or the other side of land 43, and hence with one or the other of the ports 34 or 35, according to position of the selector valve.

Assume that the brakes have been operating with cock 31 in the position shown in Figure 2 (which is "empty" position) and that cock 31 is turned to "load position" Fig. 1. This sets the cylinder for a shift of the selector valve. The first brake application after cock 31 is set in the position shown in Fig. 1 causes the selector valve to shift to the position shown in that figure, space 13 being vented and the application putting space 12 under pressure.

The brakes now operate on the "load" basis. After the car is unloaded the cock 31 should be turned to "empty" position, Fig. 2. This sets the cylinder for a reverse shift of the selector valve.

The first brake application after cock 31 is placed in the position shown in Fig. 2 causes the selector valve to move to the position shown in Fig. 3, both spaces 12 and 13 being equally charged, and land 44 being of larger diameter than plunger 41.

The slack adjuster 47 may be of any type operable pneumatically by pressure derived from a brake cylinder when a brake piston overtravels. A usable adjuster is shown in Instruction Pamphlet No. 5041-2 published April 1951 by The New York Air Brake Company. A copy of this pamphlet is filed with this application.

In its broadest aspects the invention contemplates a valve mechanism which will connect the cylinder alternatively to act as a simple cylinder with one of the two side ports effective and to act as a differential cylinder with the other of the two side ports effective. This can be done in various ways. The preferred structure illustrated in which the changeover cock and selector valve are separated, has the advantage that the changeover cock can be located as desired without imposing serious piping complications and the further advantage that the selector valve is included in the brake cylinder structure so that the side ports are short.

The selector valve is simple to construct and will withstand the effects of vibration, an important consideration in this art. In the illustrated embodiment a manually actuated changeover valve means is shown. This valve means may be and commonly is automatically actuated and no limitation to a manually actuated valve means is implied.

What is claimed is:

1. In an air brake, the combination of a pneumatic slack adjuster; a brake piston of the differential type comprising connected piston heads of unequal diameters; a cylinder structure having axially alined bores of unequal diameters corresponding to the diameters of said piston heads, and in which bores said heads are reciprocable, the larger head serving to separate two working spaces of unequal effective areas; side ports formed in the cylinder structure and each adapted to be exposed to the fluid pressure in a respective working space by a corresponding piston head as the brake piston moves in a brake-applying direction beyond a chosen limit; a brake cylinder connection through which motive air is supplied to and exhausted from the larger of said working spaces; and valve means having separate connections to each of said two working spaces and to atmosphere and separate connections to each of said side ports and to the slack adjuster, said valve means having two alternative settings in which respectively it establishes one or the other of two operating conditions, namely a "load" condition in which the brake cylinder connection, communicating with the larger working space, may be supplied with motive air, the smaller working space is vented and the side port which is controlled by the larger piston is connected with the slack adjuster, and a "light" condition in which the brake cylinder connection communicates with both working spaces, the side port controlled by the larger piston is closed, and the side port controlled by the smaller piston is connected with the slack adjuster.

2. In an air brake the combination of a pneumatic slack adjuster; a brake piston of the differential type comprising connected piston heads of unequal diameters; a cylinder structure having axially alined bores of unequal diameters corresponding to the diameters of said piston heads, and in which bores said heads are reciprocable, the larger head serving to separate two working spaces of unequal effective areas; side ports formed in the cylinder structure and each adapted to be exposed to fluid pressure in a respective working space by a corresponding piston head as the brake piston moves in the brake-applying direction beyond a chosen limit; a brake cylinder connection through which motive air may be supplied to and exhausted from that working space having the larger effective area; a selector valve having three connections namely a separate one to each of said side ports and one to said slack adjuster, said selector valve having two positions in which respectively it connects one or the other side port with said slack adjuster; a differential piston motor arranged to shift said selector valve between said positions; two flow connections, one serving to subject the smaller piston of said differential piston motor to pressure in the brake cylinder working space of larger effective area, and the other serving to subject the larger piston of the differential piston motor to pressure in the brake cylinder working space of smaller effective area; and a two-position light and load valve having separate connections to respective brake cylinder working spaces and also a vent port said valve serving in "load" position to disconnect the working spaces from each other and connect the smaller working space with the vent port and in "light" position to connect the working spaces with each other and close the vent port.

3. The combination of a brake cylinder of the differential piston type having two working spaces of unequal effective areas and adapted to develop different braking forces according as both or only the larger one of the working spaces is charged; pilot valve means having separate connections to each of said two working spaces and to atmosphere, and having two settings, and effective according to its setting during a brake application, to cause both working spaces to be charged or the larger one to be charged and the other not charged; a pneumatic slack adjuster; means affording distinct side-port flow-connections from respective working spaces to said slack adjuster; valve means shiftable reversely to render said side-port flow-connections selectively effective and motor means serving to shift the last named valve means reversely according as both or only the larger one of said working spaces is charged.

References Cited in the file of this patent

UNITED STATES PATENTS

| | | |
|---|---|---|
| 2,084,662 | Williamson | June 22, 1937 |
| 2,092,391 | Girscht | Sept. 7, 1937 |